(12) United States Patent
Isomäki et al.

(10) Patent No.: US 7,864,734 B2
(45) Date of Patent: *Jan. 4, 2011

(54) COMMUNICATION SYSTEM AND METHOD TO BE PERFORMED IN A COMMUNICATION SYSTEM

(75) Inventors: Markus Isomäki, Espoo (FI); Balazs Bertenyi, Budapest (HU); Eva-Maria Leppänen, Tampere (FI); Jouko Tenhunen, Helsinki (FI); Harri O. Koskinen, Helsinki (FI); Haluk Tekbulut, Helsinki (FI)

(73) Assignee: Nokia Corporation, Espoo (FI)

( * ) Notice: Subject to any disclaimer, the term of this patent is extended or adjusted under 35 U.S.C. 154(b) by 479 days.

This patent is subject to a terminal disclaimer.

(21) Appl. No.: 11/896,409

(22) Filed: Aug. 31, 2007

(65) Prior Publication Data

US 2009/0028089 A1    Jan. 29, 2009

Related U.S. Application Data

(62) Division of application No. 10/104,014, filed on Mar. 25, 2002, now Pat. No. 7,349,402.

(51) Int. Cl.
*H04Q 7/00* (2006.01)

(52) U.S. Cl. .................. 370/331; 370/349

(58) Field of Classification Search ........ 370/395.2, 370/349, 310.2, 328, 333, 395.3, 395.54, 370/329, 331, 389, 384, 385, 377, 338

See application file for complete search history.

(56) References Cited

U.S. PATENT DOCUMENTS

| 7,349,402 B2 * | 3/2008 | Isomaki et al. ........... 370/395.2 |
| 2001/0049790 A1 | 12/2001 | Faccin et al. |
| 2002/0047437 A1 | 4/2002 | Janisiewicz et al. |
| 2004/0146040 A1 | 7/2004 | Phan-Anh et al. |

FOREIGN PATENT DOCUMENTS

WO    WO 0213567 A1 *    2/2002

OTHER PUBLICATIONS

3G TS 23.228 V2.0.0, (Mar. 2001), "$3^{rd}$ Generation Partnership Project; Technical Specification Group Services and System Aspects; IP Multimedia (IM) Subsystem—Stage 2".

3GPP TS 23.228 V5.7.0, (Dec. 2002), "$3^{rd}$ Generation Partnership Project; Technical Specification Group Services and System Aspects; IP Multimedia (IM) Subsystem—Stage 2".

* cited by examiner

*Primary Examiner*—Brenda Pham
(74) *Attorney, Agent, or Firm*—Mintz, Levin, Cohn, Ferris, Glovsky, and Popeo, P.C.

(57) ABSTRACT

The invention relates to a communication method and system wherein a network element of a roaming user is attachable to a visited first network and may still be served by a serving means of the home network. The network element of the roaming user is able to indicate a preference, e.g. home or local control, when registering or initiating a connection. A network element of the visited network such as proxy means adds information on the indicated preference when sending a message to the home network. The message is preferably sent as a protocol message, in particular a message of the Session Initiation Protocol (SIP).

12 Claims, 2 Drawing Sheets

COMMUNICATION SYSTEM AND METHOD TO BE PERFORMED IN A COMMUNICATION SYSTEM

This is a divisional application of U.S. patent application Ser. No. 10/104,014, filed on Mar. 25, 2002. The disclosure of the prior application is hereby incorporated by reference in its entirety.

FIELD OF THE INVENTION

The invention relates to the field of mobile communication. In particular, the invention addresses the controlling of connections or connection-related parameters in a case where a connection involves two or more networks.

BACKGROUND OF THE INVENTION

In network architectures, different service models for roaming subscribers may be provided. When a user is roaming, a control means or control function such as Serving-CSCF "Call State Control Function", to which a subscriber is registered and where the connection control such as the call state control is handled, may still be located in the home network. In such a home service model, it is important to pass different kinds of information from the visited network to the home network for proper connection control.

Solutions proposed for emergency calls are not applicable to general cases where service should be chargeable and thus the bill sender, i.e. the home network operator, should also be able to prevent its use.

In third generation mobile networks telephony and multimedia services can be provided by IP Multimedia Subsystem (IMS). In 3GPP (3GPP=$3^{rd}$ Generation Partnership Project) standardization it has been decided that services are controlled by subscriber's home network even when the subscriber is roaming in some visited network. It is however required that the visited network allows access to services of a local nature to visiting subscribers (inbound roamers) as well. This should be achieved with minimal changes to the current IMS architecture.

WO 02/13567 (corresponding to PCT/EP00/07779, the disclosure contents of which are herewith fully incorporated into the present application) discloses a communication method and system wherein during call setup or registration of a User Equipment (UE) having roamed to a visitor network, a Proxy-CSCF (Call State Control Function) in the visited network assists the Serving CSCF in the home network by providing information about the local destination. This information is provided in a SIP (Session Initiation Protocol) request from the User Equipment. By providing information about the local destination, the home network is able to correctly handle (route, charge, ban, etc) the calls/sessions originated from the visited network.)

SUMMARY OF THE INVENTION

The invention provides a system and a method which enable a user-selectable control, e.g. handling or processing, of a connection such as a call even when a subscriber should be attached to a visited network.

In accordance with an aspect of the invention, a communication system is provided as defined in the claims. According to a further aspect of the invention, a method is provided as defined in the method claims.

In more detail, the invention provides a communication method and communication system comprising at least one first network element attachable to a first network and connectable to a second network element of the first network, the second network element being able to access a third network element located in a second network, wherein the first network element sends a first message to the second network element for requesting a call, session, or connection to another network element, the first message, e.g. a protocol message such as a signalling message like a SIP INVITE Request, indicating a preference of the first network element, e.g. of local or home control, this preference being taken into account in the second network element or another controlling network element when routing the call, session, or connection.

The first network preferably is a visited network, and the second network is a home network of the first network element.

The second network element or said another controlling network element may be a proxy or serving Call State Control Function (CSCF).

The preference may be indicated in any of the following ways:
  by including an indication in a Request URI
  by using an existing caller preferences header,
  by a specific header,
  in the message body.

When the first network element does not indicate a preference, a default value, which can either be 'local' or 'home' control, may be selected for controlling the call, session, or connection.

During call setup or registration, a Proxy-CSCF in the first network may assist a Serving CSCF in the second network by providing information about the local destination of the first network element.

The second network element receiving said first message containing the indication of preference may provide the indication either directly or after conversion to a control network element of the second network.

DETAILED DESCRIPTION OF PREFERRED EMBODIMENTS OF THE INVENTION

Figure 1:
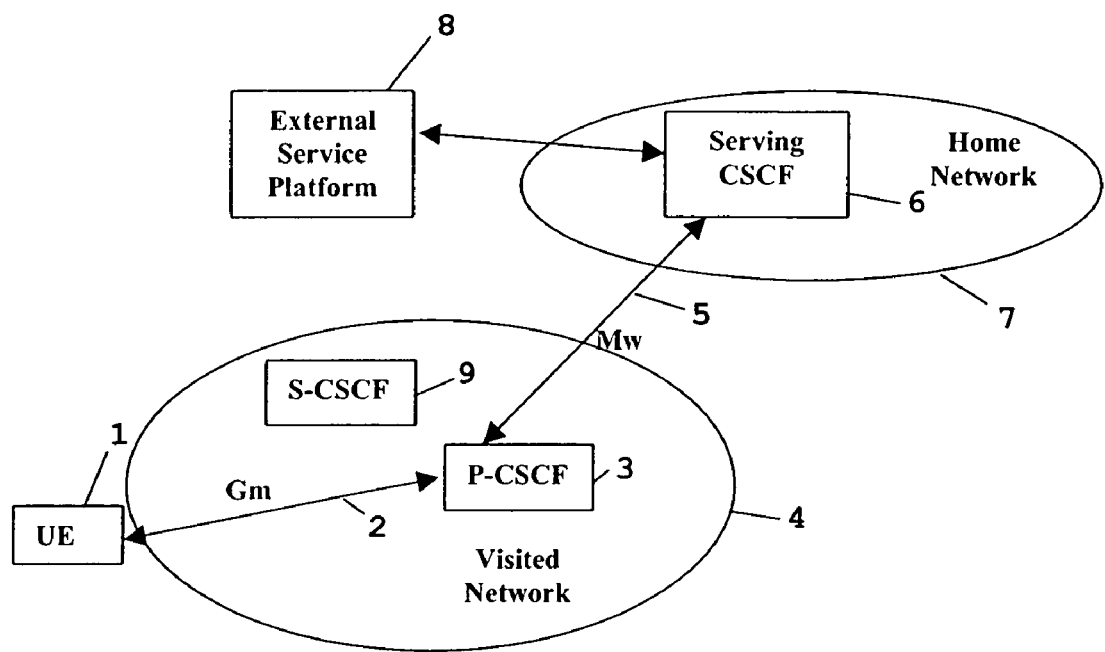
FIG. 1 shows a basic concept of a network structure and message flows usable for implementing embodiments of the invention.

In IMS, telephony and multimedia sessions are setup and controlled using a suitable protocol such as Session Initiation Protocol (SIP). A method and system for the visited network to offer services, such as local numbering plans or universal access numbers, is presented.

Embodiments of the invention include the following ideas:

A terminal (e.g. mobile user equipment) originating an intended session is able to indicate either its preference as to "local" or "home" service control.

A device or function such P-CSCF in the visited network is able to detect local service sessions and provide information where to route such a session for further analysis. It can also indicate the type or category of the service.

A device or function such as S-CSCF in the home network can route the session based on information provided by P-CSCF, disallow it based on subscriber profile and service type, or route it only based on the original address or number provided by the terminal.

The following implementations may be provided solely or in combination:

Signalling is always routed via the home network.

It is possible to offer more advanced local services by e.g. routing back the session to the visited network and some device or function in the visited network, e.g. a SIP element (such as a S-CSCF), provides further logic to the session.

The proposed solution enables an IMS operator to offer local services (such as local numbering/addressing plans or universal access numbers/addresses) to inbound roaming subscribers or home subscribers in a specific part of the network. It gives the home operator the ultimate decision to allow or disallow the service offered by the visited network (e.g. based on subscriber profile and service type). It also allows the subscriber to explicitly state whether the service should be provided by the visited or home operator, thus solving overlapping numbering/addressing problems. This is done by minimal changes to the currently approved 3GPP service control architecture.

The invention starts from the solution presented in PCT/EP00/07779, and suggests that a UE (UE=User Equipment, or more general, a terminal) is implemented to be able to indicate its preference (of local or home control) in an initial message such as a SIP (SIP=Session Initiation Protocol) request so that an entity or function of the home network, e.g. S-CSCF (S-CSCF=Serving Call State Control Function) in the home network, can take it into account.

An entity or function of the visited network, e.g. P-CSCF (P-CSCF=Proxy Call State Control Function) in the visited network, receiving such message, e.g. SIP request, containing the indication of preference can provide the information the home network, e.g. S-CSCF in the home network, needs for handling the call or session.

The P-CSCF may always provide the additional information; or it may provide the info if there is no preference indication by the UE; or it may provide the info only if there is a preference indication by the UE. The S-CSCF in the home network receiving the (e.g. SIP) request containing user preference and/or info provided by the P-CSCF is able to better service the subscriber who is roaming under a visited network.

The basic structure of the invention may e.g. be implemented such as disclosed in PCT/EP00/07779. As described there, information sent by the P-CSCF to the home network for initiating a session, can be the service type or service rate or globally routable address of the destination, etc. Additionally, according to the present invention, the user has a possibility to indicate a preference on a call basis. This means that even when the P-CSCF in the visited network provides at registration the address of a local entity to be accessed by the S-CSCF of the home network, the user preference is preferably indicated in the SIP INVITE request.

The present invention provides the general idea of the UE indicating its preference in a signalling message (e.g. SIP INVITE Request) and of taking into account this preference in the controlling network element (P-CSCF and/or S-CSCF) when routing the call/session.

The preference can be indicated in any of e.g the following ways:

by including an indication in the Request URI,
by using existing caller preferences header,
by a specific (new) header,
in the message body (a 3GPP specific indication).

A UE not indicating a preference can be interpreted as a preference of either 'local' or 'home' control depending on the implementation.

FIG. 1 shows a basic concept of a network structure and message flows such as known from the standards of 3GPP and usable for implementing embodiments of the invention. FIG. 1 presents the routing and control of an originating session on a high level.

A UE 1 (terminal) intending to initiate a session, e.g. a call, to another entity, sends a message 2, e.g. SIP INVITE, to an entity or function, e.g. P-CSCF 3, which resides in a visited network 4 to which the UE is presently attached. P-CSCF 3 routes the message, e.g. the INVITE message, as message 5, to an entity or function, e.g. a Serving CSCF 6, which is always in a home network 7 of the UE 1. S-CSCF 6 has access to service platforms and user profile, e.g. to external service platform 8. The routing of the intended session toward the final destination depends on the address information in messages 2, 5 and the service rules provided by service platform 8 and user profile.

The invention presented here follows this routing paradigm of FIG. 1 so that no changes to 3GPP IMS control architecture are needed.

The main ideas, implementable either solely or in any arbitrary combination, in the solution according to preferred embodiments of the invention are:

Terminal 1 can indicate, e.g. in message 2 such as SIP INVITE message, whether "local" or "home" service control is preferred. The selection of "local" or "home" service control can be a default selection or can be effected per session basis. This indication may be done by inserting the information into message 2, e.g. in SIP INVITE message. Such insertion can be done e.g. by defining a new REQUEST-URI parameter or a new header (URI=Universal Resource Identifier), and by adding such parameter or header to the message 2. It solves the problem of overlapping numbering/addressing spaces in local and home services.

P-CSCF 3 can detect all destination numbers or addresses (URIs) with local significance (e.g. those belonging to local numbering/addressing plan or universal access numbers/addresses with local presence). This detection can be done in various ways. Detection can be helped by defining certain prefixes or addressing spaces for such use. This is however just an optimization. P-CSCF 3 will not do the detection if terminal has indicated "home" service control preference.

P-CSCF 3 can then translate such a number or address (URI) included in the message 2 from UE 1 to a globally meaningful number or address (URI). This number/address points toward the final destination, and it can be used by the home network 7 to determine the routing. P-CSCF 3 inserts this number/address in the SIP message 5 it forwards toward home network 7. It can be inserted e.g. in Request-URI, Route header or some new header. P-CSCF 3 can also send the new URI to the terminal 1 with a message, e.g. SIP redirect message.

If the local service requires more complex operations than simple address/number translation, P-CSCF 3 should insert to INVITE such routing information which causes the call to be routed to a SIP component specialized for such services. Also e.g. geographical location can be analyzed in this component if the service so requires and the information is available in INVITE. This makes P-CSCF 3 implementation simple: it only needs to do the translation and no further control.

P-CSCF 3 can also know the type or categorization of the service, e.g. based on the price of the service (free, premium) or content offered by the service (entertainment, information). P-CSCF 3 can insert this information to the outgoing SIP INVITE message 5. This can be done e.g. as a new parameter or header.

S-CSCF 6 is responsible for routing message 5, e.g. SIP INVITE, toward the final destination. If terminal 1 has set service control preference to "home", S-CSCF 6 will receive INVITE with no local service specific modification by P-CSCF 3, and will continue with the routing as usual. If service control preference is set to "local" or left empty, S-CSCF 6 will honor the possible addressing/routing modifications done by P-CSCF 3 and will route the call according to them. However, if the subscriber profile indicates that certain local services are not allowed to the him/her, S-CSCF 6 can decide to prevent the service or route the session solely based on home network information. In this decision service type can be used if it is available.

The principle that local services sessions are also routed always via home network 7 allows home network 7 to implement originating services such as prepaid or barring for the local service sessions. It also follows the guidelines of 3GPP standardization.

If the subscriber is in his/her home network 7 while initiating the session, "local" indication may be equal to "home" depending on the operator network configuration. In this case S-CSCF 6 can handle the service solely based on home network data.

Figure 2:
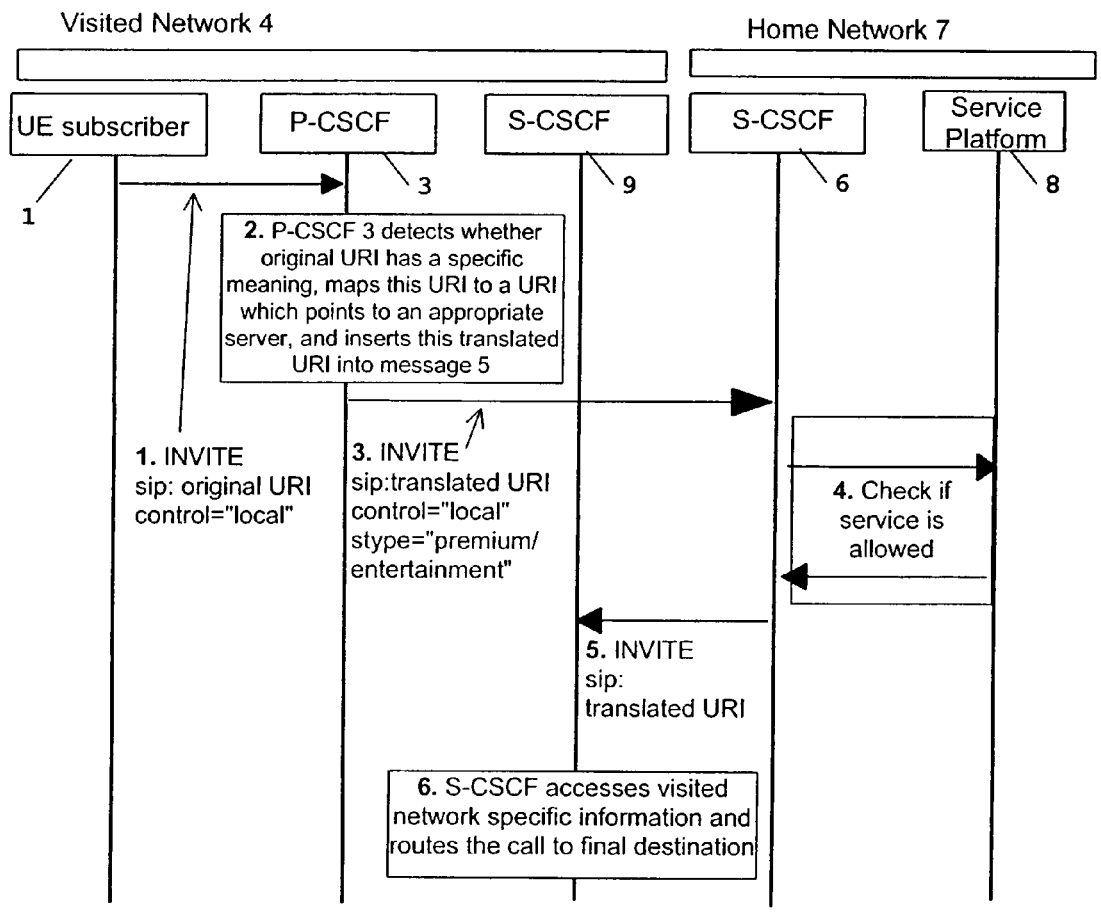
FIG. 2 presents an example of a session origination in an embodiment of a method and system in accordance with the present invention.

FIG. 2 presents an example of session origination using the principles described above. The following step numbering corresponds to the step numbering shown in FIG. 2.

1.) UE 1 sends an INVITE toward certain URI with control preference "local".

2.) P-CSCF 3 detects that the original URI has a specific meaning (e.g. it is an abbreviated number to local weather service). P-CSCF 3 maps this URI to a URI which points to a server able to route the call to the correct destination. P-CSCF 3 inserts this translated URI into message 5 (FIG. 1), e.g. a SIP INVITE message. P-CSCF 3 is also able to insert the service type (e.g. premium/information) to this (e.g. INVITE) message 5.

3.) The INVITE message 5 with the translated URI and service type is sent toward the home network 7.

4.) S-CSCF 6 of the home network 7 notices that service control is "local", and determines whether such a service is allowed to the subscriber (e.g. using the service type information). This determination can be effected by sending an inquiry message to the external service platform 8 which, after checking its database and the subscriber-related information stored therein, returns an answer message indicating allowance or inhibition of the requested service.

5.) If the session is allowed, the call is routed to a serving entity, e.g. S-CSCF 9 in the visited network 4, according to information provided by P-CSCF 3 in the message 5. In this case the routing points to S-CSCF 9. The S-CSCF 6 informs the S-CSCF 9 by sending a message.

6.) S-CSCF 9 in the visited network 4 has access to visited network specific information and can route the call to the final destination accordingly. It can also provide terminated services for the session. (In this case it can e.g. use geographical location info to route the call to the weather announcement server nearest to the user, or do call forwarding if the first such server is busy.)

Although the invention has been described above by mainly referring to preferred embodiments, the invention may also be incorporated in network architectures of other types, such as GPRS-based, UMTS-based, GSM-based networks, etc. Further, although the SIP Protocol is preferred, other protocols may also be used for transferring the messages such as call originating or registering messages. The scope of the invention is not limited to the above described preferred embodiments and also covers modifications, amendments, omissions and alterations of the above-described features.

What is claimed is:

1. A method, comprising:

sending, by a first network element, a first message to a second network element to request a call, session, or connection to another network element, wherein the first network element is configured to be connected to the second network element, wherein the first network element and second network element are in a first network of a communication system, and wherein the second network element is configured to be able to access a third network element located in a second network;

indicating, in the first message, a preference of the first network element, wherein the preference indicates whether local control or home control is preferred;

taking the preference into account in the second network element or another controlling network element when routing the call, session, or connection; and assisting, by a proxy call state control function in the first network during call setup or registration, a serving call state control function in the second network by providing information about a local destination of the first network element.

2. A communication system, comprising:

a first network element configured to be attached to a first network;

a second network element of the first network, wherein the first network element is configured to be connected to the second network element and wherein the second network element is configured to access a third network element located in a second network, wherein the first network element is configured to send a first message to the second network element to request a call, session, or connection to another network element, wherein the first message is configured to indicate a preference of the first network element, wherein the second network element or another controlling network element is configured to take the preference into account when routing the call, session, or connection, wherein the preference indicates whether local control or home control is preferred; and a proxy call state control function in the first network configured to, during call setup or registration, assist a serving call state control function in the second network by providing information about the local destination of the first network element.

3. An apparatus comprising:

a proxy call state control function configured to assist, during call setup or registration, a serving call state control function in a second network by providing information about a local destination of a first network element, wherein the first network element is configured to be attached to a first network and to be connected to a second network element of the first network, wherein the second network element is configured to access a third network element located in a second network, wherein a message, sent from the first network element to the second network element to request a call, session, or connection to another network element, is configured to indicate a preference of the first network element, wherein the preference indicates whether local control or home control is preferred, and wherein the second network element or another controlling network element is configured to use the preference when routing the call, session, or connection.

4. The apparatus of claim 3, wherein the first message comprises a protocol message.

5. The apparatus of claim 4, wherein the protocol is a session initiation protocol.

6. The apparatus of claim 3, wherein the first network comprises a visited network, and the second network comprises a home network of the first network element.

7. The apparatus of claim 3, wherein the second network element or said another controlling network element comprises a call state control function.

8. The apparatus of claim 3, wherein the first message comprises a signaling message.

9. The apparatus of claim 3, wherein the preference is indicated in at least one of the following ways: by including an indication in a request uniform resource identifier, by using an existing caller preferences header, by a specific header, or in the message body.

10. The apparatus of claim 3, wherein the second network element is configured to provide, when receiving said first message indicating the preference, said preference either directly or after conversion to a control network element of the second network.

11. The apparatus of claim 3, wherein the first network element comprises a user equipment.

12. The apparatus of claim 8, wherein the signaling message comprises a session initiation protocol invite request.

* * * * *